(12) United States Patent
Sultan et al.

(10) Patent No.: US 8,442,072 B2
(45) Date of Patent: May 14, 2013

(54) METHOD OF PREVENTING TRANSPORT LEAKS IN HYBRID SWITCHING NETWORKS BY EXTENSION OF THE LINK LAYER DISCOVERY PROTOCOL (LLDP)

(75) Inventors: Robert Sultan, Somers, NY (US); Linda Dunbar, Plano, TX (US); Lucy Yong, Tulsa, OK (US); T. Benjamin Mack-Crane, Downers Grove, IL (US)

(73) Assignee: Futurewei Technologies, Inc., Plano, TX (US)

( * ) Notice: Subject to any disclaimer, the term of this patent is extended or adjusted under 35 U.S.C. 154(b) by 550 days.

(21) Appl. No.: 12/057,190

(22) Filed: Mar. 27, 2008

(65) Prior Publication Data

US 2008/0291922 A1 Nov. 27, 2008

Related U.S. Application Data

(60) Provisional application No. 60/940,335, filed on May 25, 2007.

(51) Int. Cl.
*H04J 3/24* (2006.01)
(52) U.S. Cl.
USPC .......................................................... 370/474
(58) Field of Classification Search .............. 370/395.53, 370/401, 402, 403, 474
See application file for complete search history.

(56) References Cited

U.S. PATENT DOCUMENTS

| | | | |
|---|---|---|---|
| 5,867,497 A * | 2/1999 | Fujimori et al. ............... | 370/384 |
| 5,968,126 A * | 10/1999 | Ekstrom et al. ............... | 709/225 |
| 6,151,322 A | 11/2000 | Viswanath et al. | |
| 6,219,699 B1 | 4/2001 | McCloghrie et al. | |
| 6,813,250 B1 * | 11/2004 | Fine et al. ..................... | 370/256 |
| 2005/0195949 A1 * | 9/2005 | Frattura ....................... | 379/88.17 |
| 2005/0265346 A1 * | 12/2005 | Ho et al. ........................ | 370/392 |
| 2005/0276408 A1 * | 12/2005 | McDonald et al. ........... | 379/219 |
| 2006/0039378 A1 | 2/2006 | Medina et al. | |

(Continued)

FOREIGN PATENT DOCUMENTS

| | | |
|---|---|---|
| CN | 1356806 A | 7/2002 |
| CN | 1571377 A | 1/2005 |
| JP | 2003244185 A | 8/2003 |
| WO | 2005099183 | 10/2005 |

OTHER PUBLICATIONS

"IEE Std 802.1Q-2005, Virtual Bridged Local Area Networks", May 19, 2006, p. 1-303.*

(Continued)

*Primary Examiner* — Huy D Vu
*Assistant Examiner* — Adnan Baig
(74) *Attorney, Agent, or Firm* — Conley Rose, P.C.; Grant Rodolph; Rayhao Chung

(57) ABSTRACT

An apparatus comprising a processor configured to implement a method comprising receiving a first data structure comprising a first virtual local area network identifier (VID) and a first forwarding type, comparing the first VID and a first forwarding type with a second VID and a second forwarding type in a second data structure, and reporting a misprovisioned data structure if the first VID is the same as the second VID and the first forwarding type is not the same as the second forwarding type. Also disclosed is a method comprising implementing a network protocol to forward provisioning information in a plurality of VID Tables corresponding to a plurality of nodes, and analyzing the provisioning information to detect misprovisioned nodes.

28 Claims, 6 Drawing Sheets

U.S. PATENT DOCUMENTS

2007/0258446 A1* 11/2007 Smith et al. .................... 370/389
2008/0101380 A1* 5/2008 Wackerly ................. 370/395.53
2008/0107027 A1* 5/2008 Allan et al. .................... 370/235
2008/0253366 A1* 10/2008 Zuk et al. ....................... 370/389

OTHER PUBLICATIONS

Foreign Communication From a Related Counterpart Application—International Search Report and Written Opinion, PCT/CN2008/071004, Aug. 28, 2008, 9 pages.

Bottorf, Paul, et al., "Provider Backbone Transport Overview", http://www.ieee802.org/1/files/public/docs2006/new-bottorff-pbt-overview-1006-01.pdf, Nov. 26, 2006, 5 pages.

IEEE Standard, 802.1AB™, "IEEE Standard for Local and Metropolitan Area Networks, Station and Media Access Control Connectivity Discovery," May 6, 2005, 172 pages.

IEEE P802.1ah/D4.2, "Draft Standard for Local and Metropolitan Area Networks, Virtual Bridged Local Area Networks, Amendment 6: Provider Backbone Bridges", IEEE Computer Society, Mar. 26, 2008, 116 pages.

Sultan, Robert, et al., "Method of Preventing Transport Leaks in Hybrid Switching Networks", filed on Mar. 27, 2007 as U.S. Appl. No. 11/691,556.

Sultan, Robert, et al., "Method of Supporting an Open Provider Backbone Network", filed on Oct. 17, 2007 as U.S. Appl. No. 11/873,560.

"Information Technology—Telecommunications and Information Exchange Between Systems—Local and Metropolitan Area Networks—Specific Requirements—Supplement to Carrier Sense Multiple Access With Collision Detection (CSMA/CD) Access Method and Physical Layer Specifications—Frame Extensions for Virtual Bridged Local Area Network (VLAN) Tagging on 802.3 Networks," IEEE Standard, 802.3ac-1998, Sep. 16, 1998, 19 pages.

* cited by examiner

| VID | Forwarding Type |
|-----|-----------------|
| 1   | Bridged         |
| 2   | Switched        |
| 3   | Bridged         |
| ... | ...             |

METHOD OF PREVENTING TRANSPORT LEAKS IN HYBRID SWITCHING NETWORKS BY EXTENSION OF THE LINK LAYER DISCOVERY PROTOCOL (LLDP)

CROSS-REFERENCE TO RELATED APPLICATIONS

The present application claims priority to U.S. Provisional Patent Application Ser. No. 60/940,335, filed May 25, 2007 by Sultan et al., and entitled "Method of Preventing Transport Leaks and VLAN Usage Conflicts in Hybrid Switching Networks by Extension of the Link Layer Discovery Protocol (LLDP)", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communication and data networks are comprised of nodes that transport data through the network. The nodes may include routers, switches, and/or bridges that transport the individual data frames or packets through the network. A hybrid switching network is one in which the network can transport connection-oriented traffic (e.g. traffic associated with Provider Backbone Bridging-Traffic Engineering (PBB-TE)) or connectionless traffic (e.g. traffic associated with Virtual Local Area Networks (VLANs)). Specifically, the network may contain a plurality of VLAN identifiers (VIDs), and each VID may be associated with either connection-oriented or connectionless routing. For example, connectionless routing, such as hop-by-hop forwarding, can be associated with some VIDs, while connection-oriented routing, such pre-determined path forwarding, can be associated with other VIDs.

One of the problems that occur in hybrid switching networks is the misprovisioning of a node, i.e. failing to configure the node with the correct forwarding type associated with at least one VID. A node can be misprovisioned, for example, when a provider changes a VID from bridged forwarding to switched forwarding in the network without appropriately configuring the node. Consequently, the misprovisioned node continues to implement bridged forwarding instead of switched forwarding for packets associated with the VID. In some instances, transport leaks can occur where the misprovisioned nodes may flood a frame or forward multiple frame copies over more than one connection to a single destination. This results in increased bandwidth consumption and failure to meet service guarantees on some connections.

SUMMARY

In one embodiment, the disclosure includes an apparatus comprising a processor configured to implement a method comprising receiving a first data structure comprising a first VID and a first forwarding type, comparing the first VID and a first forwarding type with a second VID and a second forwarding type in a second data structure, and reporting a misprovisioned data structure if the first VID is the same as the second VID and the first forwarding type is not the same as the second forwarding type.

In another embodiment, the disclosure includes a method comprising implementing a network protocol to forward provisioning information in a plurality of VID Tables corresponding to a plurality of nodes, and analyzing the provisioning information to detect misprovisioned nodes.

In a third embodiment, the disclosure includes a network comprising a plurality of nodes configured to transport both connection-oriented data packets and connectionless data packets using a plurality of VIDs, wherein at least some of the nodes are configured to exchange VID provisioning consistency messages with each other.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for detecting misprovisioned nodes in the network, which may be used to identify frame transport leaks in hybrid switching networks. Specifically, the network nodes may contain VID Tables comprising provisioning information about the network VIDs and the forwarding type associated with each VID, where the forwarding type may comprise bridged or switched. To verify the consistency of the VID Table between the nodes, the VIDs and the associated forwarding types may be compared among the nodes with adjacent connections using a network-supported protocol, such as a Link Layer Discovery Protocol (LLDP). When inconsistencies in the VID Table entries are detected, a network management entity may be informed. Hence, the misprovisioned nodes corresponding to the VID Tables with detected inconsistencies may be reported to the operator.

Figure 1A:
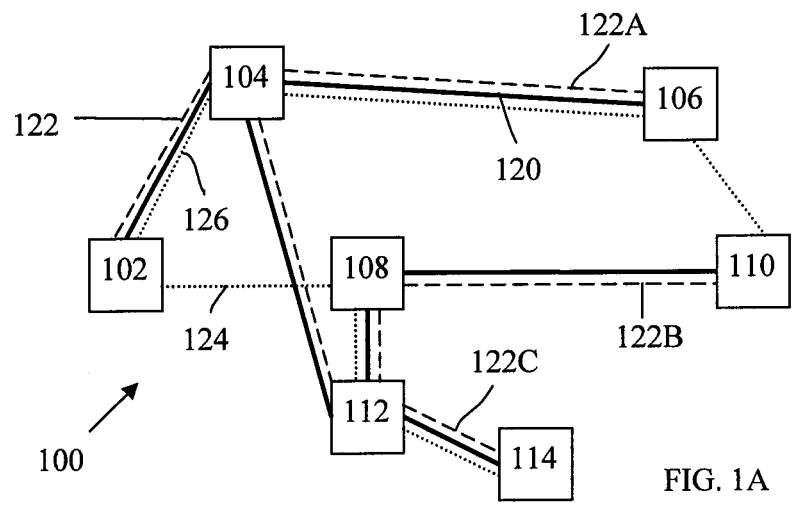
FIG. 1A is a schematic diagram of an embodiment of a hybrid communications network.
Figure 1B:
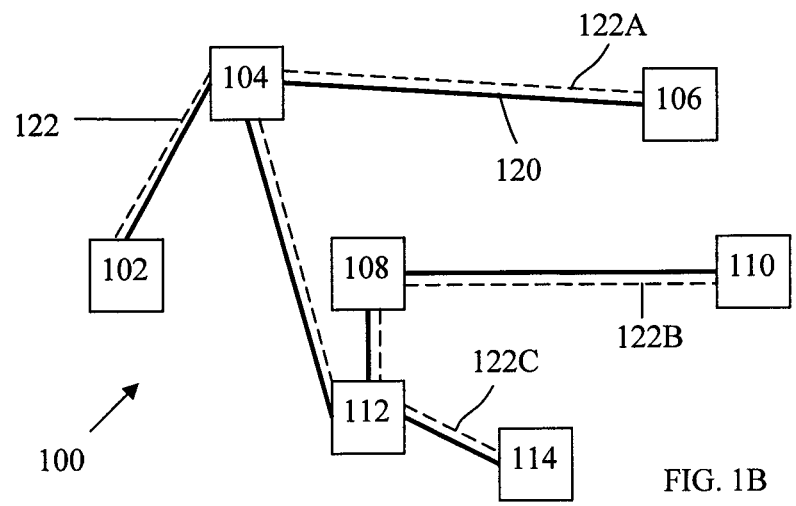
FIG. 1B is a schematic diagram of another embodiment of hybrid communications network.
Figures 1C, 2:
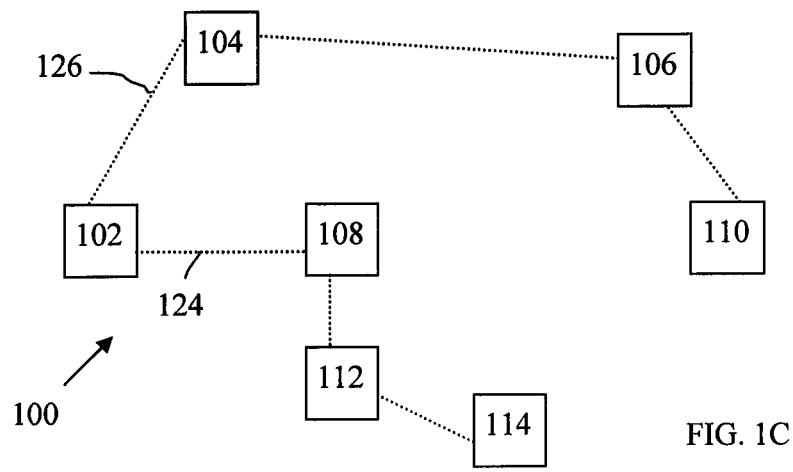
FIG. 1C is a schematic diagram of another embodiment of a hybrid communications network.
FIG. 2 is a schematic diagram of an embodiment of a VID Table.

FIGS. 1A, 1B, and 1C illustrate one embodiment of a hybrid communications network 100. Specifically, FIG. 1A illustrates an integrated network configuration, while FIG. 1B illustrates a bridged (connectionless) portion of the network and FIG. 1C illustrates a switched (connection-oriented) portion of the network. The network 100 comprises a plurality of nodes 102, 104, 106, 108, 110, 112, 114 (102-114) that may be at least partially interconnected together using a plurality of links (not shown). The flow of bridged traffic is supported by the inclusion of at least one VLAN 122 and a spanning tree 120. Similarly, the flow of switched traffic is supported by the inclusion of a plurality of connections 124, 126. These components are described in further detail below. The network 100 may differentiate the bridged traffic and the switched traffic by associating the VLAN 122 or each of the connections 124, 126, respectively, with a VID. As such, the network 100 may include a management or control plane (not shown) that may provision the nodes 102-114 such that the VIDs are associated with either the switched forwarding behavior or the bridged forwarding behavior.

The network 100 may be any type of network 100 that transports frames from a source node to a destination node. Specifically, the network 100 may be a hybrid switching network that transports both bridged and switched frames from the source node to the destination node using the VLAN 122 or the connections 124, 126. The network 100 may be a backbone network, a provider network, or an access network running any one of a variety of protocols. Ethernet is a suitable protocol, and the methods described herein may be adapted for other protocols, including Internet Protocol (IP) and Asynchronous Transfer Mode (ATM), among others. In a specific embodiment, the network 100 may be a hybrid bridged and switched Ethernet backbone network.

The nodes 102-114 may be any device that transports frames through the network 100. For example, the nodes 102-114 may include bridges, switches, routers, or various combinations of such devices. Such devices may contain a plurality of ingress ports for receiving frames from other nodes 102-114, logic circuitry to determine which nodes 102-114 to send the frames to, and a plurality of egress ports for transmitting frames to the other nodes 102-114. In an embodiment, the nodes 102-114 may make the determinations needed to transport the frames through the network at Open System Interconnection (OSI) layer two. The nodes 102-114 may include Backbone Edge Bridges (BEBs), Backbone Core Bridges (BCBs), Provider Edge Bridges (PEBs), S-VLAN Bridges as defined by IEEE 802.1ad, C-VLAN Bridges as defined by IEEE 802.1Q, or various combinations of such devices. Edge bridges may be connected to nodes within two different networks, such as a provider network and a backbone network or a customer network and a provider network, while core bridges may be connected to other nodes within the same network. For example, if the network 100 is a backbone network, then the nodes 102, 110, 114 may be BEBs, while the nodes 104, 106, 108, 112 may be BCBs.

The nodes 102-114 within the network 100 may communicate with each other via a plurality of links. The links may be electrical, optical, wireless, or any other type of communications links. While every node 102-114 within the network 100 may be connected to every other node 102-114 within the network 100, more commonly each of the nodes 102-114 may be connected to only some of the other nodes 102-114 within the network 100. Such a configuration may reduce the number of the links between the various nodes 102-114. In the case where the nodes 102-114 are geographically separated from each other, the reduced number of links may significantly decrease the complexity and the cost of the network 100.

The nodes 102-114 may send frames to other nodes 102-114 using a spanning tree 120. Briefly, the spanning tree 120 may be a protocol that resides in the network 100 and allows frames to be forwarded through the network 100 without taking circular or looping paths. Specifically, the spanning tree 120 may describe a unique path from a node in the network 100 to another node in the network 100. The uniqueness of the path may prevent loops within the network 100. The spanning tree 120 may be associated with the network 100, and there may be multiple spanning trees 120 per network 100. In steady state, a spanning tree 120 may include all nodes in the network 100. Examples of suitable spanning tree protocols for creation of a spanning tree 120 may include Spanning Tree Protocol (STP), Rapid Spanning Tree Protocol (RSTP), and Multiple Spanning Tree Protocol (MSTP).

The network 100 may include at least one VLAN 122. The VLAN 122 may be a contiguous subset of bridges and links associated with a particular spanning tree. The VLAN 122 may indicate the desired path for data to follow to get to a particular node. The VLAN 122 may have a plurality of branches 122A, 122B, 122C such that data may be transported to a node from any other node 102-114 associated with the VLAN 122. FIGS. 1A and 1B illustrate one example of a branched VLAN 122 associated with node 102. Alternatively, the VLAN 122 may be configured with a single branch, similar to a connection 124, 126. If desired, the network 100 may contain a plurality of VLANs 122 for each node.

The VLAN 122 may be used to transport the frames through the network 100 using the bridged forwarding behavior. Generally, a VLAN 122 may be a portion of a spanning tree, thus the VLAN 122 may be a tree. The VLAN 122 may have branches (e.g., branches 122A, 122B, and 122C), and all of the branches of the VLAN 122 may have the same VID. When a VID is associated with the VLAN 122, the frames associated with that VID are transported via the VLAN 122. Such a process may be implemented by adding the VID associated with the VLAN 122 to the frames and to a forwarding database in each of the nodes 102-114. When a node 102-114 receives a frame with the VID, the node 102-114 may access the forwarding database and use the frame's destination address and the VID to determine the egress port on which the frame is to be forwarded. If the forwarding database lacks an entry for the destination address and the VID, the node 102-114 may flood the frame on all of its egress ports associated with the spanning tree 120, except the port on which the frame was received. Thus, the frames may be forwarded to the destination node from any node 102-114 within the network 100.

The node 102-114 may "learn" the source address by adding the source address, the VID, and the port on which the frame was received to the forwarding database. Thus, when the node 102-114 receives a frame with a destination address identical to the previous frame's source address, the node 102-114 may know where to send the frame.

As shown in FIGS. 1A and 1C, the network 100 may include at least one connection 124, 126. The connections 124, 126 may be point-to-point logical paths between two BEBs 102, 110, 114 at the edge of the network. In specific embodiments, the connection 124, 126 may be an Ethernet Virtual Connection (EVC) as defined by the Metropolitan Ethernet Forum (MEF) or an Ethernet Switched Path (ESP).

Similar to the bridged VLAN 122, some VIDs may be associated with the connections 124, 126, and the frames associated with those VIDs are transported via with the connections 124, 126. Each connection 124, 126 may be uniquely identified by its destination address, source address, and VID. More specifically, no two connections 124, 126 in a single network 100 may share a common destination address, source address, and VID combination.

Similar to the bridged VLAN 122, the switched frames may be transported through the network 100 by adding the VID associated with the connection 124, 126 to the frames and to the forwarding database of each node 102-114 associated with the connection 124, 126. When a node 102-114 receives a frame with the VID, the node 102-114 may access the forwarding database and use the frame's destination address and the VID to determine the egress port associated with the connection 124, 126. The node 102-114 may then forward the frame to the specific egress port associated with the frame's destination address and the VID. Because the forwarding database is provisioned at each node 102-114, the flooding, learning, and spanning tree functions may not be implemented on the switched VIDs. As such, if a node 102-114 encounters a frame comprising the VID that is not in the forwarding database, the node 102-114 may drop the frame. Thus, frames traveling along the connection 124, 126 may be transported through the network 100 with minimal processing at each node 102-114.

When a node 102-114 is misprovisioned, the frames may be leaked from one connection into another connection, and thus additional bandwidth is used to transport the frames. For example, the VLAN 122 may be associated with VID 5 and the connections 124, 126 may be associated with VID 10. Thus, frames comprising VID 5 should be transported using bridged forwarding, while frames comprising VID 10 should be transported using switched forwarding. Furthermore, the node 112 may be misprovisioned in that it may erroneously associate VID 10 with bridged behavior instead of switched behavior. Moreover, since the associated VID 10 is provisioned for bridging, no forwarding entry may be provisioned at the node 112. When node 112 receives a frame associated with VID 10 from node 114, node 112 should forward the frame to node 108. However, because node 112 associates VID 10 with bridged behavior instead of switched behavior, the node 112 may process the frame as a bridged frame. Additionally, because no forwarding entry is provisioned, the node 112 may not find the frame's destination address in its forwarding database, and hence flood the frame to nodes 104 and 108 in accordance with the spanning tree 120. In such a case, node 104 may forward the frame to node 102 using the connection 126, and node 108 may also forward the frame to node 102. Thus, a frame that should have been delivered via connection 124 on the link between node 104 and node 102 is delivered on both connections 124 and 126. As a result, additional bandwidth is consumed on this link, displacing capacity reserved for traffic on connection 126. VID misprovisioning is described in further detail in U.S. patent application Ser. No. 11/691,556 filed Mar. 27, 2007 by Sultan et al. and entitled "Method of Preventing Transport Leaks in Hybrid Switching Networks", which is incorporated by reference as if reproduced in its entirety.

FIG. 2 illustrates an embodiment of a VID Table 200 that may comprise the VIDs associated with the bridged or switched portions of the network 100. Specifically, the VID Table 200 may comprise at least two columns: a VID column 210 and a forwarding type column 220. The VID column 210 may list the VIDs corresponding to the VLANs and connections within the network 100. The forwarding type column 220 may list the forwarding types associated with each VID. Thus, the rows within the VID Table 200 may characterize the forwarding type associated with each VID in the network. In an embodiment, the VID Table 200 at each node 102-114 may only comprise the entries for the VIDs associated with the VLANs that are accessed by the node 102-114 (e.g. VLAN 122 or connection 124, 126). As such, the VID Table 200 may vary in size from one node to another depending on the number of VLANs that are accessed by the nodes.

The VID Table 200 may be accessible by every node 102-114, distributed by the management or control plane, or exchanged between nodes using a network protocol, such as an LLDP. For instance, a network management entity, such as a network management system (NMS), may generate a VID Table 200 and distribute copies of the VID Table 200 or advertise the VID Table 200 entries to each node 102-114. In other embodiments, the VID Table 200 entries 102-114 may be exchanged by the individual nodes 102-114, with or without management entity support, using the protocols or methods described herein. These same methods may be used to update and verify the consistency of entries in the VID Tables 200 at each node 102-114.

The LLDP, as specified by IEEE 802.1AB, may be used to advertise and exchange local information between adjacent nodes in the network 100. The local information may comprise the nodes' capabilities, network addresses, management entities, etc. The LLDP may also be used to verify the compatibility of the node's provisioning properties with those of neighboring nodes, and report discrepancies in the provisioning information to the management or control plane or an operator. Furthermore, the management entity may query the neighboring nodes' information collected by each node and assemble the information in the form of a topology map comprising more comprehensive provisioning information in the network 100. The topology map may hence be used to verify the consistency of the provisioning information between non-adjacent nodes.

Figure 3:
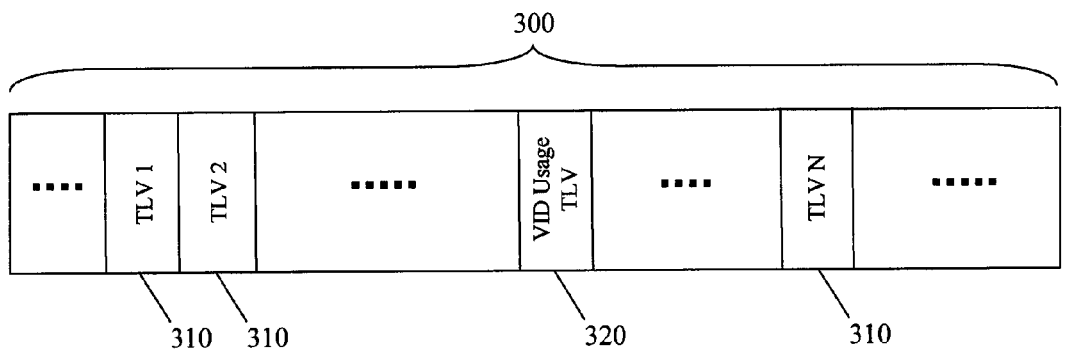
FIG. 3 is an illustration of an embodiment of a Link Layer Discovery Protocol Data Unit.

FIG. 3 illustrates an embodiment of an LLDP Data Unit (LLDPDU) 300 that may be used, as part of the LLDP, to send and receive the provisioning information between the nodes 102-114. The information in the LLDPDU 300 may be encoded within a plurality of Type Length Value (TLV) fields. Each TLV field may comprise a type portion that identifies what kind of information is being sent, a length portion that indicates the length of the information string, and a value portion that comprises the actual information that is being sent. Specifically, the LLDPDU 300 may comprise a plurality of TLV fields 310. The TLV fields 310 may comprise connectivity management information, such as information about the sending LLDP agent or port and the expiration time of the information. The TLV fields 310 may also comprise organizationally specific information TLV fields, such as information about the VID, port and protocol associated with a VID. In an embodiment, the organizationally specific information TLV fields may comprise a VID Usage TLV field 320 that specifies the forwarding type associated with the VID. For example, the VID Usage TLV field 320 may allow an IEEE 802.1Q-compatible IEEE 802 LAN station to advertise the assigned usage of a VID, which may be a switched or bridged. The TLV fields 310 may also comprise other TLV fields, such as management system related TLV fields.

Figure 4:
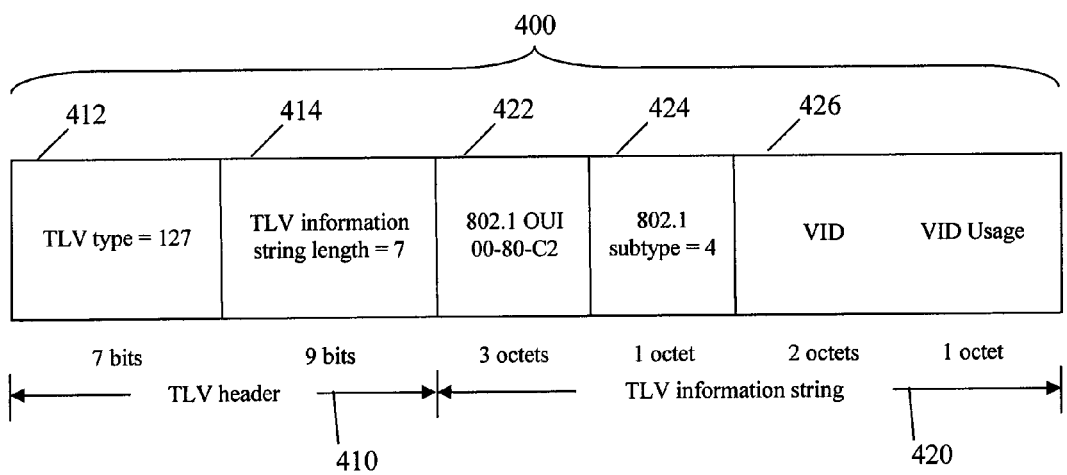
FIG. 4 is an illustration of an embodiment of a Type Length Value field.

FIG. 4 illustrates an embodiment of a VID Usage TLV field 400. Specifically, the VID Usage TLV field 400 may comprise a TLV header 410 and a TLV information string 420. The TLV header 410 may be comprised by a TLV type subfield 412 and a TLV information string length subfield 414. The TLV type subfield 412 and the TLV information string length subfield 414 may each comprise a fixed number of bits, which may be equal to that of the corresponding subfield in the other TLV fields. For instance, the TLV type subfield 412 and the TLV information string length subfield 414 may comprise, respectively, a fixed number of about seven and about nine bits. The TLV type subfield 412 may also be set equal to a fixed value to indicate that the VID Usage TLV field 400 is one of the organizationally specific information TLV fields. For instance, the TLV type subfield 412 may be set equal to about 127, which may also be assigned to the other organizationally specific information TLV fields. The TLV information string length subfield 414 may be assigned a value equal to the length (in octets) of the subsequent TLV information string 420. In an embodiment, the TLV information string length subfield 414 may be set equal to about seven, which may be a fixed length of the TLV information string 420 in octets.

The TLV information string 420 may comprise an organizationally unique identifier (OUI) subfield 422, a subtype subfield 424, and an information string subfield 426. The OUI subfield 422 may be equal in length to a fixed number of octets, for instance about three octets, similar to other organizationally specific information TLV fields. The OUI subfield 422 may also be set equal to a fixed designated value to indicate that the VID Usage TLV field 400 is compatible with IEEE 802.1 standard. The subtype subfield 424 may be about one octet in length, similar to other organizationally specific information TLV fields. The subtype subfield 424 may be set equal to a fixed value, for instance about four, to identify and distinguish the VID Usage TLV field 400 from other organizationally specific information TLV fields, such as a Port VID TLV field, a Port Protocol VID TLV field, a VLAN Name TLV field, or other TLV fields.

The information string subfield 426 may be equal to the remaining length of the TLV information string 420, for instance about three octets. The information string subfield 426 may comprise VID usage information that corresponds to one entry in the VID Table. Specifically, a portion of the information string subfield 426, for instance about two octets, may be dedicated for one of the VIDs in the VID Table, and a remaining portion, for instance about one octet, may be dedicated for the forwarding type or VID usage associated with the VID. For instance, the VID usage may specify whether the VID is associated with a bridged or switched forwarding behavior. As such, each VID Usage TLV field 400 in the LLDPDU may advertise information about the forwarding type for one VID in the network. Alternatively, the LLDPDU may comprise a plurality of VID Usage TLV fields 400 to advertise the forwarding type corresponding to a plurality of VIDs in the network.

In some embodiments, the LLDPDU may comprise a single VID Usage TLV field comprising VID usage information that corresponds to more than one entry in the VID Table. As such, a TLV information string of the VID Usage TLV field may be greater in length than the TLV information string 420 shown in FIG. 4, and a TLV information string length subfield 414 may be adjusted accordingly to reflect the length of the TLV information string 420. In one embodiment, the information string subfield 426 may comprise all or some VIDs in the VID Table, and the forwarding types associated with those VIDs. In an alternative embodiment, the information string subfield 426 may comprise all or some of the VIDs and the associated forwarding types. Because these embodiments may substantially lengthen the TLV information string 420, various algorithms may be used to reduce the size of the TLV information string 420, e.g. to about eight, nine, ten, or more octets.

Figure 5:
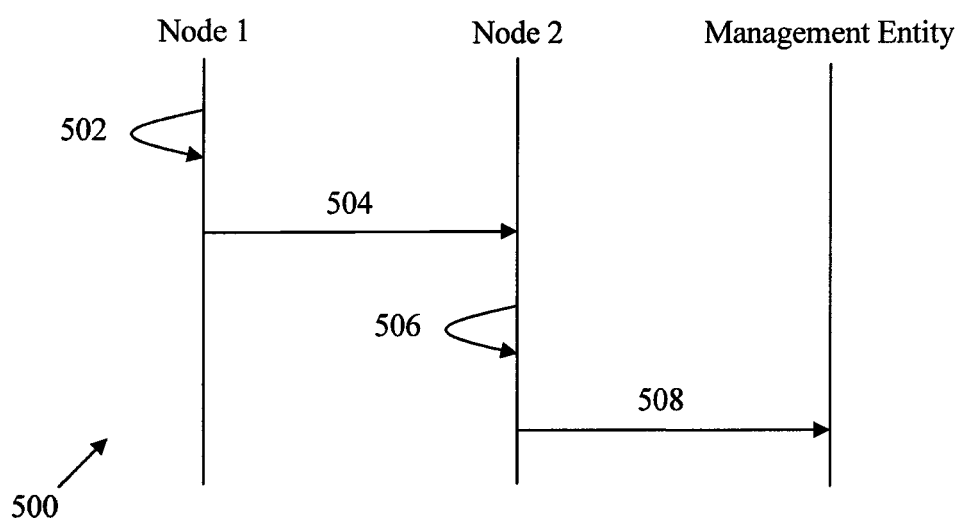
FIG. 5 is a protocol diagram of an embodiment of a method for implementing a Link Layer Distribution Protocol.

FIG. 5 is a protocol diagram of one embodiment of a method 500 for implementing an LLDP. The method 500 may generate an LLDPDU for a first node and send the LLDPDU to a second node in connection with the first node to verify the consistency of the provisioning information between the first node and the second node. The method 500 may be implemented by an LLDP agent when the connection is established between the first node and the second node or when the first node's provisioning information is updated. The LLDP agent may be a management entity, any node in the network, or any other component in the network configured to implement the LLDP.

At 502, the method 500 may begin when communications are established between the first node and the second node, for instance, when the link between the two nodes becomes active. Additionally or alternatively, the method 500 may begin when any changes in the first node's provisioning information are detected. The method 500 may extract the first node's provisioning information and generate an LLDP message comprising the provisioning information (e.g. an LLDPDU) and optionally other system information. Specifically, the method 500 may obtain the network VIDs and associated forwarding types from the first node's VID Table, convert the VIDs and the associated forwarding types to TLV fields according to the format described above, and optionally combine the TLV fields with other TLV fields into the LLDPDU. At 504, the method 500 may send the LLDPDU comprising the first node's provisioning information to the second node.

At 506, the method 500 may extract the first node's provisioning information from the LLDPDU and compare the LLDPDU's provisioning information with the provisioning information in the second node's VID Table. When the method 500 detects inconsistencies between the LLDPDU's provisioning information and the second node's provisioning information, the method 500 may notify the management entity or the network operator at 508. For instance, when the method 500 detects an inconsistency in the forwarding types assigned to the same VID in the LLDPDU's and the second node's provisioning information, the method 500 may send an inconsistency notification or alarm message to the management entity or operator.

In some embodiments, when the first node's provisioning information is updated frequently over time periods relatively shorter than the LLDPDU processing time, the method 500 may delay generating and sending the LLDPDU to the second node. Similarly, when the first node establishes frequent connections with other nodes during the LLDPDU processing time, the method 500 may wait for a predetermined elapsed time before sending the LLDPDU. As such, the method 500 may avoid sending additional LLDPDUs over such relatively short time periods and may allow sufficient processing time for previously sent LLDPDUs. For example, the method 500 may wait for a preset time expiration using a countdown timer before sending a subsequent LLDPDU.

Figure 6:
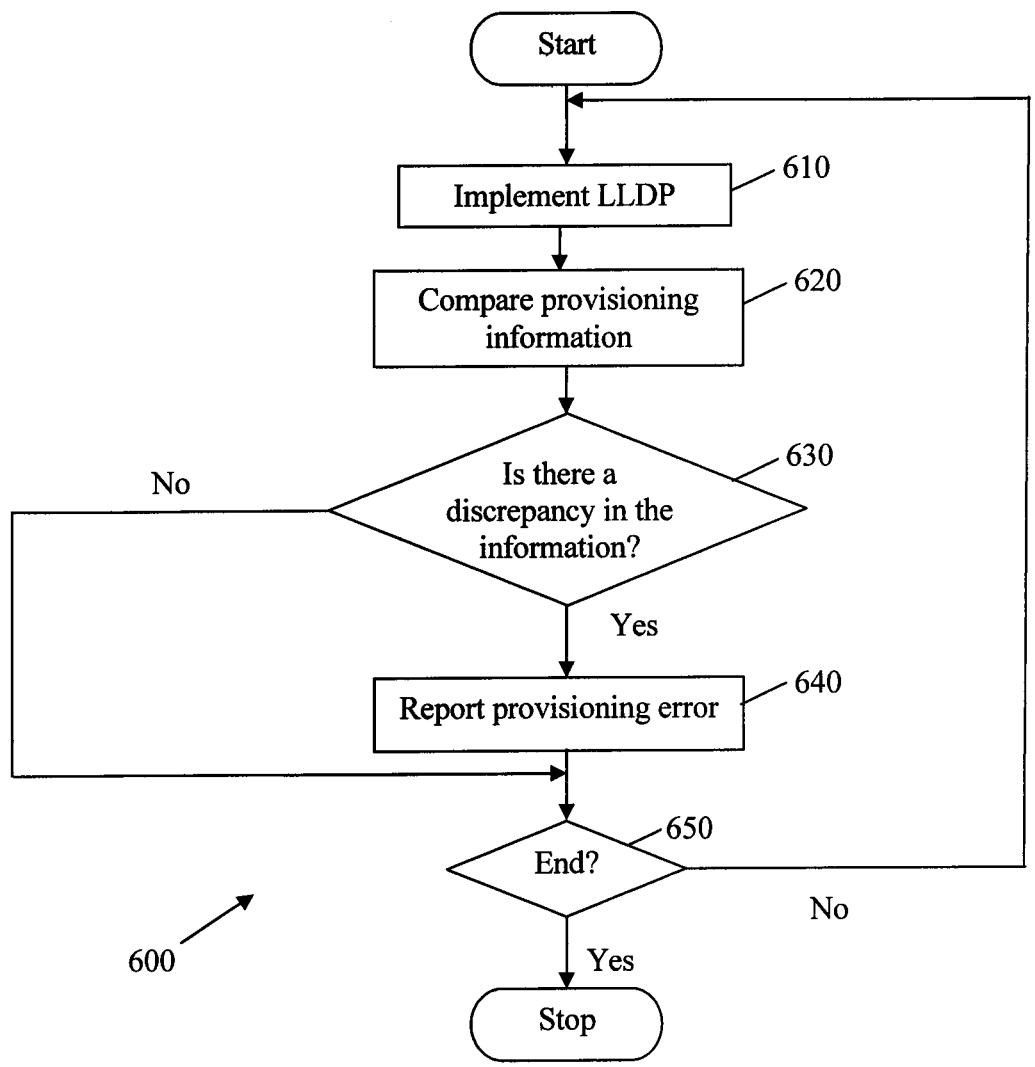
FIG. 6 is a flowchart of one embodiment of a VID Table Consistency Verification Method.

FIG. 6 illustrates one embodiment of a VID Table consistency method 600, which may be implemented to detect misprovisioned nodes in the network. Specifically, the method 600 may be implemented by a network management entity, such as an NMS, or a dedicated node to detect inconsistencies in the VID Tables corresponding to a plurality of nodes in the network. The method 600 may also be implemented or controlled by a management or control plane.

At block 610, the method 600 may implement the LLDP protocol, using for instance the method 500, to compare the provisioning information in the VID Tables corresponding to two neighbor or connected nodes and notify the management entity of any inconsistencies. For example, LLDP agents in adjacent bridges may exchange VID Table entries via LLDP messages when the link between them comes up or when there is a change in VID Table content. In such a case, the LLDP agent may compare the usage information it receives for a VID with its local version of that information at block 620, and determine whether there is a discrepancy at block 630. If there is a discrepancy, it may be reported via a Simple Network Management Protocol (SNMP) Alert or a similar means to the Network Management System at block 640. At block 650, the method 600 may verify whether a request to terminate the method has been issued. For example, the method 600 may check for any requests from the management entity or the operator to terminate. When a termination request is detected, the method 600 may end. Otherwise, the method 600 may return to block 610.

Figure 7:
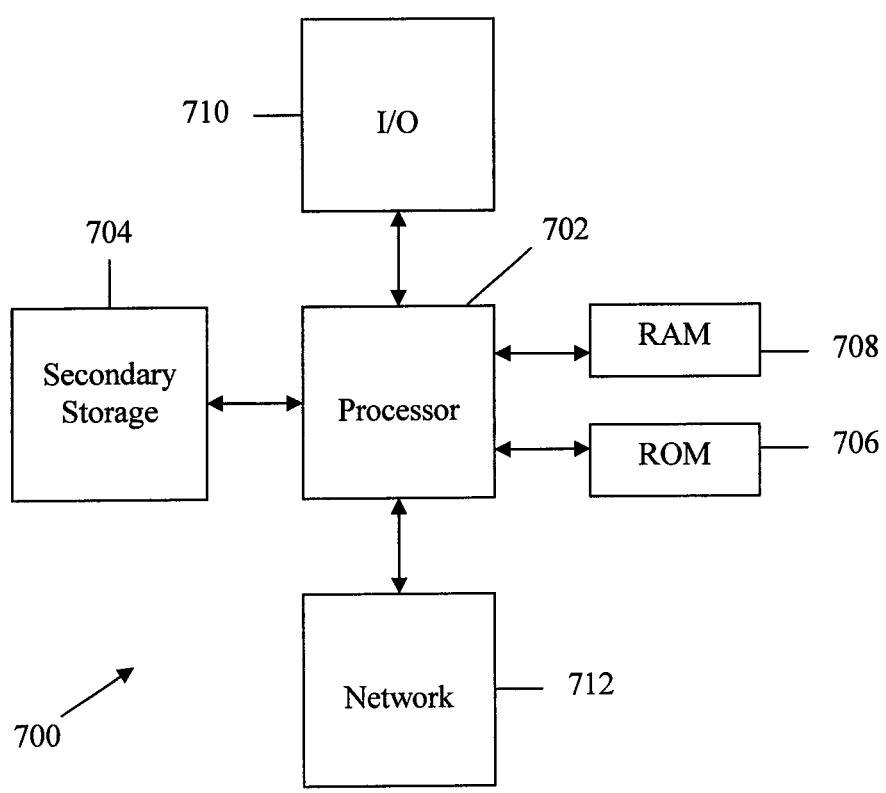
FIG. 7 is a schematic diagram of an embodiment of a general-purpose network component.

The network components described above may be implemented on any general-purpose network component, such as a computer or network component with sufficient processing power, memory resources, and network throughput capability to handle the necessary workload placed upon it. FIG. 7 illustrates a typical, general-purpose network component suitable for implementing one or more embodiments of a node disclosed herein. The network component 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor may be implemented as one or more CPU chips, or may be part of one or more application specific integrated circuits (ASICs).

The secondary storage 704 is typically comprised of one or more disk drives or tape drives and is used for non-volatile storage of data and as an over-flow data storage device if RAM 708 is not large enough to hold all working data. Secondary storage 704 may be used to store programs that are loaded into RAM 708 when such programs are selected for execution. The ROM 706 is used to store instructions and perhaps data that are read during program execution. ROM 706 is a non-volatile memory device that typically has a small memory capacity relative to the larger memory capacity of secondary storage 704. The RAM 708 is used to store volatile data and perhaps to store instructions. Access to both ROM 706 and RAM 708 is typically faster than to secondary storage 704.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a processor configured to:
receive a frame comprising a destination address;
receive a first data structure that associates a virtual local area network identifier (VID) with a first forwarding type;
compare the first forwarding type with a second forwarding type that is associated with the VID in a second data structure; and
determine a misprovisioned data structure if the first forwarding type identifies a different forwarding behavior than the second forwarding type,
wherein the first forwarding type identifies a first forwarding behavior that floods the frame when the destination address is unknown to the apparatus, and
wherein the second forwarding type identifies a second forwarding behavior that drops the frame when the destination address is unknown to the apparatus.

2. The apparatus of claim 1, wherein the first data structure is part of a Link Layer Discovery Protocol message.

3. The apparatus of claim 1, wherein the first data structure and the second data structure are individual entries in a table comprising a plurality of the VIDs and a plurality of the forwarding types associated with the VIDs, and wherein the first forwarding type and the second forwarding type are associated to the same VID.

4. The apparatus of claim 1, wherein the first data structure and the second data structure comprise a plurality of the VIDs and a plurality of the forwarding types associated with the VIDs.

5. The apparatus of claim 4, wherein the first data structure further comprises a type length value (TLV) that comprises the VID and the first forwarding type, and wherein the TLV comprises a length from about eight octets to about ten octets.

6. The apparatus of claim 1, wherein the first data structure comprises a data structure type, a data structure information length, and a data structure information string.

7. The apparatus of claim 6, wherein the data structure information string comprises a unique identifier, a data structure subtype, the VID, and the first forwarding type.

8. The apparatus of claim 7, wherein the data structure type is about seven bits in length, the data structure information length is about nine bits in length, the data structure information string is about seven octets in length, the unique identifier is about three octets in length, the data structure subtype is about one octet in length, the VID is about two octets in length, and the first forwarding type is about one octet in length.

9. The apparatus of claim 6, wherein the data structure information string is about eight octets in length.

10. The apparatus of claim 1, wherein the first forwarding type is a non-provider backbone bridging-traffic engineering (PBB-TE) and the second forwarding type is a PBB-TE.

11. The apparatus of claim 1, wherein the method is implemented using a network management system or application.

12. The apparatus of claim 1, wherein the misprovisioned data structure is reported using a Simple Network Management Protocol (SNMP) Alert.

13. A method for a first node and a second node to detect whether the second node is misprovisioned within a network, the method comprising:
establishing a plurality of virtual local area network identifier (VID)/forwarding-behavior association that associates a plurality of VID with either a provider backbone bridging-traffic engineering (PBB-TE) forwarding behavior or a non-PBB-TE forwarding behavior;

forwarding a first provisioning information node, wherein the first provisioning information from the first node to the second node indicates a first VID/forwarding-behavior association; and comparing the first VID/forwarding-behavior association with a second VID/forwarding-behavior association to determine whether the second node is misprovisioned, wherein the second VID/forwarding-behavior association is indicated by a second provisioning information stored at the second node, wherein the VID for the first VID/forwarding-behavior association and the VID for the second VID/forwarding-behavior association are the same, and wherein the second node is misprovisioned if the second VID/forwarding-behavior association indicates that the VID is associated with a different forwarding behavior than the first VID/forwarding-behavior association, wherein the forwarding behaviors are either the PBB-TE forwarding behavior or the non-PBB-TE forwarding behavior.

14. The method of claim 13, wherein the first provisioning information is carried in a link layer discovery protocol (LLDP) control packet.

15. The method of claim 13, wherein the first provisioning information is carried in a control packet that is forwarded according to a network protocol, and wherein the network protocol is implemented either when the second node and another node establish a connection or when the second node updates its VID Table.

16. The method of claim 13, wherein the second provisioning information is stored in a VID Table comprising at least one VID associated with a plurality of forwarding types.

17. A method for a node to detect misprovisioning within a network, the method comprising:

receiving a Virtual Local Area Network (VLAN) Identifier (VID) usage type-length-value (TLV) comprising a VID usage field that indicates whether a VID is assigned to a provider backbone bridging-traffic engineering (PBB-TE) usage or a non-PBB-TE usage; and comparing the VID usage field with a VID usage table to detect inconsistencies in the assignment of a plurality of VID values to the PBB-TE usage and the non-PBB-TE usage in the VID usage table, wherein the VID usage table indicates whether the plurality of VID values are assigned to the PBB-TE usage or the non-PBB-TE usage, wherein an inconsistency is detected when the VID usage table indicates that a first VID value is assigned to a different PBB-TE usage or non-PBB-TE usage than the VID usage field indicates for the VID, and wherein the first VID value and the VID are the same.

18. The method of claim 17, wherein the VID usage TLV further comprises: a TLV type, a TLV information string length, an Institute of Electrical and Electronics Engineers (IEEE) 802.1 organizationally unique identifier (OUI), and an IEEE 802.1 subtype, wherein the PBB-TE usage discards a frame if the frame is not found in a forwarding data base, and wherein the non PBB-TE usage floods the frame if the frame is not found in a forwarding database, wherein the PBB-TE usage discards a frame if the frame is not found in a forwarding data base, and wherein the non-PBB-TE usage floods the frame if the frame is not found in a forwarding data base.

19. The method of claim 18, wherein the TLV type is equal to 127 and is seven bits long, the TLV information string length is nine bits long, the IEEE 802.1 OUI is equal to 00-80-C2 and is three octets long, and the IEEE 802.1 subtype is one octet long.

20. The method of claim 18, wherein an algorithm is used to reduce the size of a second VID usage table and produce the VID usage field.

21. A method for a node to detect misprovisioning within a network, the method comprising:

obtaining a value of a Virtual Local Area Network (VLAN) Identifier (VID) Usage associated with a system from a VID Usage Table, wherein a bit of the VID Usage Table contains a binary one to indicate a Provider Backbone Bridging-Traffic Engineering (PBB-TE) usage (PBB-TE-USAGE) value if the corresponding element of a multiple spanning tree (MST) Configuration Table contains a PBB-TE MST identifier (MSTID) value, wherein the bit of the VID Usage Table contains a binary zero to indicate a NON-PBB-TE-USAGE value if the corresponding element of the MST Configuration Table contains a non-PBB-TE MSTID value, wherein differences in the value of the VID Usage are used to detect inconsistencies in the assignment of VID values to either PBB-TE usage or non-PBB-TE usage, wherein the PBB-TE usage disables flooding a frame when the frame is not found in a forwarding database, wherein the non-PBB-TE usage floods the frame when the frame is not found in a forwarding database, and wherein the VID usage has been provisioned throughout a Local Area Network (LAN) and the information carried in a VID Usage Type-Length-Value (TLV) is used to detect a misconfiguration.

22. The method of claim 21, wherein the VID Usage is a VID Usage Digest, wherein the value of the VID Usage Digest associated with the system is obtained by applying an algorithm to the VID Usage Table, and wherein the TLV information string length is eight octets long.

23. The apparatus of claim 1, wherein the second forwarding type identifies either a flooding and learning forwarding behavior or a provisioned forwarding behavior that does not include flooding and learning.

24. The apparatus of claim 23, further comprising:
a plurality of ports associated with a spanning tree; and
a memory comprising a forwarding database,
wherein if the second forwarding type identifies the flooding and learning forwarding behavior, then the forwarding database is not provisioned by an administrator to associate the ports with destination addresses, and
wherein if the second forwarding type identifies the provisioned forwarding behavior, then the forwarding database is provisioned by an administrator to associate the ports with destination addresses.

25. The apparatus of claim 23, further comprising:
a plurality of ports associated with a spanning tree; and
a memory comprising a forwarding database, wherein the second forwarding type identifies the flooding and learning forwarding behavior such that the forwarding database is not provisioned by an administrator to associate the ports with destination addresses, and
wherein the processor is further configured to:
receive a first data packet comprising the VID, a source address, and a destination address on a first one of the ports before receiving any other data packets comprising the VID on any of the ports;
update the forwarding database to associate the first port with the source address; and
flood the first data packet on each of the ports except for the first port, wherein the first data packet is flooded without regard to the destination address.

26. The apparatus of claim 23, further comprising:

a plurality of ports associated with a spanning tree; and a memory comprising a forwarding database, wherein the second forwarding type identifies the provisioned forwarding behavior such that the forwarding database is provisioned by an administrator to associate at least some of the ports with destination addresses, and wherein the processor is further configured to:

receive a first data packet comprising the VID and a destination address on a first one of the ports before receiving any other data packets comprising the VID on any of the ports;

identify a second one of the ports that is associated with the destination address by referencing an appropriate entry in the forwarding database; and forward the first data packet on the second port without forwarding the first data packet on any of the other ports.

27. The apparatus of claim 1, wherein the first data structure is carried in a control packet that is distributed to the apparatus via a control plane, and wherein the control packet does not carry any network traffic.

28. The apparatus of claim 13, wherein the PBB-TE forwarding behavior discards a frame when the destination address is unknown to the apparatus, and wherein the non-PBB-TE forwarding behavior floods a frame when the destination address is unknown to the apparatus.

* * * * *